United States Patent [19]
Candelaria et al.

[11] Patent Number: 5,717,888
[45] Date of Patent: Feb. 10, 1998

[54] ACCESSING CACHED DATA IN A PERIPHERAL DISK DATA STORAGE SYSTEM USING A DIRECTORY HAVING TRACK AND CYLINDER DIRECTORY ENTRIES

[75] Inventors: Susan Kay Candelaria; Joseph Smith Hyde; Vernon John Legvold, all of Tucson, Ariz.

[73] Assignee: International Business Machines Corporation, Armonk, N.Y.

[21] Appl. No.: 459,864

[22] Filed: Jun. 2, 1995

[51] Int. Cl.$^6$ ............................................. G06F 12/12
[52] U.S. Cl. ........................... 395/440; 395/463; 395/419
[58] Field of Search ........................... 395/439, 440, 395/438, 404, 412, 463, 418, 419

[56] References Cited

U.S. PATENT DOCUMENTS

| | | | |
|---|---|---|---|
| 4,464,713 | 8/1984 | Benhase et al. | 364/200 |
| 4,499,539 | 2/1985 | Vosacek | 364/200 |
| 4,920,478 | 4/1990 | Furuya et al. | 395/463 |
| 5,206,939 | 4/1993 | Yanai et al. | 395/400 |
| 5,235,692 | 8/1993 | Ayres et al. | 395/425 |
| 5,253,351 | 10/1993 | Yamamoto et al. | 395/425 |
| 5,269,019 | 12/1993 | Peterson et al. | 395/600 |
| 5,283,884 | 2/1994 | Menon et al. | 395/425 |
| 5,513,336 | 4/1996 | Vishlitzky et al. | 395/463 |
| 5,530,829 | 6/1996 | Beardsley et al. | 395/440 |

FOREIGN PATENT DOCUMENTS

| | | |
|---|---|---|
| 1-98042 | 4/1989 | Japan . |
| 5-74046 | 3/1993 | Japan . |

OTHER PUBLICATIONS

Abstract of Japanese Patent 54-63008 May 22, 1979.

*Primary Examiner*—Eddie P. Chan
*Assistant Examiner*—Vincent Yip
*Attorney, Agent, or Firm*—H. F. Somermeyer

[57] ABSTRACT

In a data storage system having a direct access storage device (DASD) and a cache, a cache directory has two types of directory entries. A track directory entry TDE identifies up to one DASD track of data records currently stored in cache. All records stored in a DASD track can be stored in a cache storage space allocated for the DASD track identified by the TDE. A cylinder directory entry CDE identifies a number N of records from any track in a respective cylinder of tracks. N is a positive integer less than the total number of records storable in a DASD track. From one to all of the DASD tracks in one cylinder may be identified in a CDE. The cache data storage allocation corresponding to a CDE is the same as that allocated for a TDE. Each TDE is addressed by a DASD track address of a cylinder while a CDE is addressed using a pseudo track number corresponding to a servo track in the DASD. A record cast out control for the cache includes examining the number of records destaged. Based on the number of records cast out from cache to DASD, a cache event parameter CEP is modified or maintained. Accessing cache requires examining a current CEP value for each accessed DASD track to access either the TDE or CDE.

24 Claims, 4 Drawing Sheets

ACCESSING CACHED DATA IN A PERIPHERAL DISK DATA STORAGE SYSTEM USING A DIRECTORY HAVING TRACK AND CYLINDER DIRECTORY ENTRIES

FIELD OF THE INVENTION

The present invention relates to cached disk data storage systems, particularly to accessing the cache with different directory structures based upon a number of records previously cached at one time from respective disk tracks.

BACKGROUND OF THE INVENTION

Cached disk data storage systems have relatively large data caches (many megabytes of data storage capacity). In disk data storage systems employing direct access storage devices (DASD), cache accessing is by using the physical address of the data as stored on the DASD. Such physical addresses include device addresses D, cylinder addresses CC and head (disk surface) addresses HH. Each DASD has a plurality of co-axial co-rotating data storage disks, such as eight such data storage disks. One surface of one of the disks is used as a servo disk to facilitate accessing all radial positions of the disks. In an 8-disk DASD, this arrangement leaves 15 data recording surfaces. The disk surfaces are identified using hexadecimal notation of 0-E (E is 15 decimal). The servo surface has address F (16 decimal). The servo surface is not addressed by a peripheral controller data circuits of the data storage system.

Data are stored in tracks on the data storing surfaces of disk as defined on, the servo surface. All data tracks having a common radius constitute one cylinder of tracks, viz one radial position on all of the disk surfaces. Since each data surface is scanned by one read/write head, each recording surface is addressed through that head, hence has a head address. The address DCCHH indicates device D, cylinder CC and head HH.

In many instances, cache data storage space is allocated on a so-called track basis. That is, enough cache data storage space is allocated to store data from any DASD track having data staged or promoted to cache or received from a host processor to be stored in a given track. In many instances, less than all of the data from one DASD track is used by a host processor. Less than all data stored in a DASD track may be staged into the cache. As a result, cache data storage space can be inefficiently used. Accordingly, it is desired to provide for a more efficient usage of cache while maintaining one track allocation sizes such that all data stored in a given DASD track can be stored in the cache while data less than an entire DASD track can be easily stored in cache. Simple and efficient addressing techniques are to be maintained. That is, for generalized record caching that the record numbers and cache storage location of such data records be predictive in the cache and entries in the directory be predictive (i.e. in a sequence of record numbers). It is assumed that data record sizes in each track of a cylinder are the same.

DISCUSSION OF PRIOR ART

Benhase et al in U.S. Pat. No. 4,464,713 show a cache accessing arrangement for a DASD data storage system. A directory is accessed using a hashing algorithm and a scatter index table (SIT) to identify a directory entry for a DASD track data that are stored in the cache. A directory miss (no corresponding directory entry of a record) indicates that no data are cached for the addressed DASD track. The SIT indexes the hash output to the appropriate directory entry.

Vosacek in U.S. Pat. No. 4,499,539 shows conserving cache space when data staged to cache is less than data for an entire track. The allocation units are one-third of a DASD track. Initially, three units are allocated. After staging data to cache, all of the allocated units not containing data are deallocated.

Yanai et al in U.S. Pat. No. 5,206,939 show a record accessing system. Each record has a record identification portion. A record locator table stores each record identification portion and an index to the storage location of each record. The table is in a high speed semiconductor memory for reducing record search time.

Aryes et al in U.S. Pat. No. 5,235,692 show a cached DASD subsystem in which the DASD operate asynchronously with host data transfers. The rotational DASD position of each record is kept in a rate-changing buffer for simulating DASD access.

Peterson et al in U.S. Pat. No. 5,269,019 show managing data records in non-volatile memory using a variable length directory. A table, ordered sequentially by record number indicates location of each record in the non-volatile memory. Scanning the table avoids scanning the non-volatile memory.

Yamamoto et al in U.S. Pat. No. 5,253,351 show a controller that promotes data to a cache in accordance with an access pattern to the data. A learn function develops a control mode related to the learned data loading method. Learned sequential and random accessing increases a hit ratio for the cache.

Menon et al in U.S. Pat. No. 5,283,884 show a CKD channel with a predictive track table. The table has a compact description of record length and record count for facilitating rapid access to cached data.

Japan publication (NEC Corp) 01-98042 (Apr. 17, 1989) shows increasing cache reading speed with a same DASD cylinder number by storing information after reading it from each track. A cylinder input number (CC), head number (HH) and record number is stored in a temporary memory. If the memory is empty, the DASD is accessed to obtain a record.

Japan publication (Tokico LTD) 05-74046 (Mar. 26, 1993) show shortening a read process by dividing a cache into plural areas, then reading those areas in accordance with prescribed track location data for the cache. Such location data are stored separately from the user data.

SUMMARY OF THE INVENTION

The present invention enables cache allocation units to store data from either one DASD track or from more than one track of a cylinder of such DASD tracks, preferably in one cylinder of tracks and in constant-sized ones of the cache allocation units.

A peripheral data storage system has a cache and a cache directory. The cache directory has two types of entries. Each of a plurality of a first type of entry stores directory data for one DASD track. Each of a plurality of a second type of directory entry stores directory data for a plurality of DASD tracks preferably in one cylinder of tracks.

Criteria for selecting either a first type (track directory entry) or a second type (cylinder directory entry) for cache stored data is based upon a number of records previously simultaneously stored in cache from each of the DASD tracks. If a number of records to be stored exceed a cylinder directory entry capacity for one DASD track, then a track directory entry is used. A cylinder directory entry may be used for less than all of the DASD tracks in a cylinder. Those tracks in a cylinder yielding more than a given number of records to be stored in cache are identified in a track directory entry while remaining tracks in the same cylinder are identified in a cylinder directory entry.

Accessing data stored in a cache requires first identifying whether the directory entry for a DASD track having data stored in cache is identified via a track directory entry or a cylinder directory entry. A cache event parameter table identifies all DASD tracks and whether or not a cylinder or track directory entry is to be used. Each time data are destaged from cache to DASD, the number of records destaged is noted for each track. If the number of records destaged is greater than a predetermined threshold, such as a maximum number of records identifiable for each track in a cylinder directory entry, is exceeded a cache event parameter (CEP) value is altered indicating usage of a track directory entry to be used for subsequent cache operations for the addressed DASD track. If the number of records destages is less than the cylinder directory entry capacity for each track, then the CEP value is altered tending to indicate usage of a cylinder directory entry for subsequent cache operations.

The track directory entries are identified by the device physical addressing of cylinder and head (CCHH). The cylinder directory entries are identified by respective cylinder addresses CC and a HH value, such as F, indicating a servo disk surface a data-unaddressable servo track. Address F is interpreted to indicate a CDE for the cylinder address CC. Each cylinder directory entry CDE contains a track section for each data track of the cylinder. If any track identified in a cylinder directory entry is to have a number of records greater than the cylinder directory entry, then a track directory entry is created for that track while the remaining tracks continue to be identified in the cylinder directory entry. The cache event table is altered to reflect the changes so that directory accessing is directed to the track directory entry for the one track while all other tracks continue to be accessed via the cylinder directory entry.

The foregoing and other objects, features and advantages of the invention will be apparent from the following more particular description of preferred embodiments of the invention, as illustrated in the accompanying drawings.

DETAILED DESCRIPTION

Figure 1:
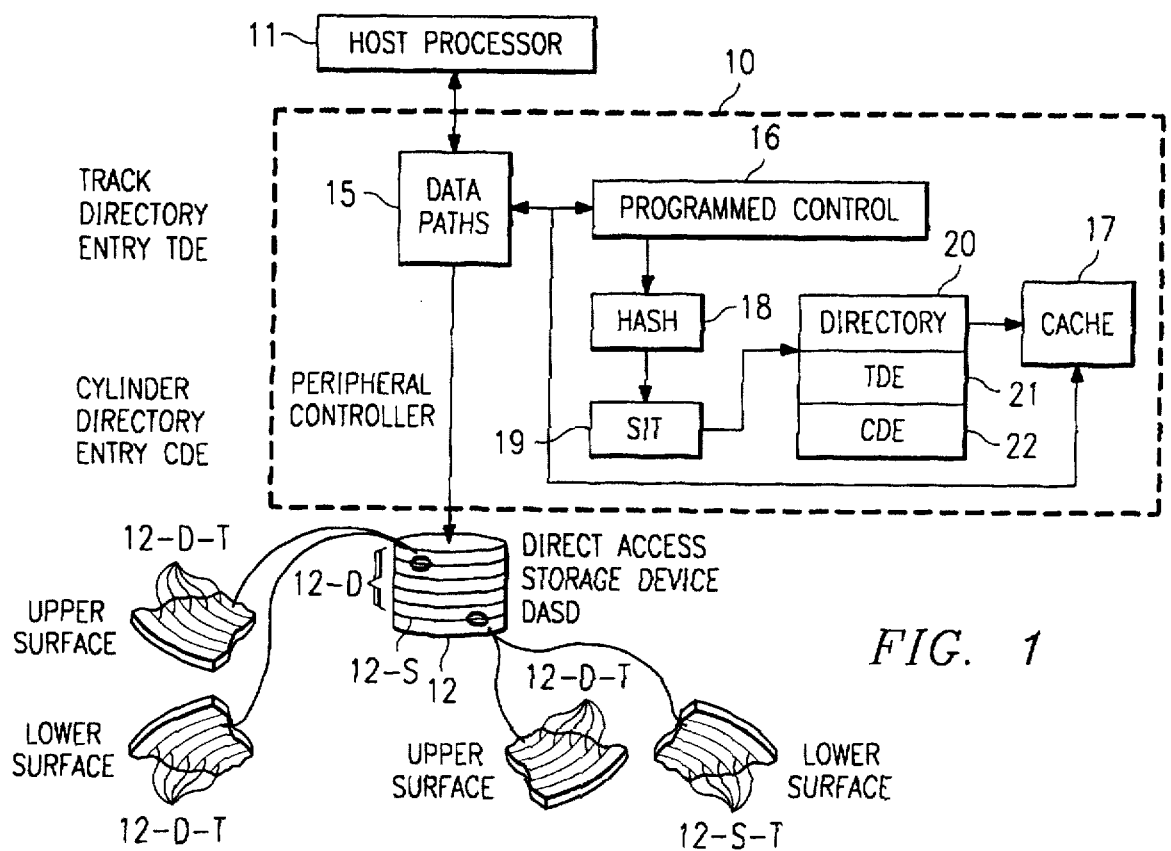
FIG. 1 illustrates a data processing system in simplified block diagram form in which the present invention is advantageously employed.

Referring now more particularly to the appended drawing, like numerals indicate like parts and structural features in the various figures. In FIG. 1, peripheral controller 10 connects host processor 11 to a peripheral data storage sub-system indicated by direct access storage device (DASD) 12, such as described above. A practical data storage system usually includes a plurality of inter-connected devices 12. Device 12 is a usual multi-recording surface disk data storage device. Controller 10 includes data paths 15 that provide data transfer paths between device 12, host processor 11 and controller 10. Data paths 15 include the usual buffering, data detection, formatters, error detection and correction and adaptors to host processor 10 and device 12, for example. Programmed control 16 responds to host processor 11 issued peripheral commands, received via data paths 15, to operate the controller for accessing device 12. Control 16 includes one or more microprocessors (not shown). Semiconductor high-speed cache 17 (capacity of 100's of megabytes, for example) selectively stores data from or for device 12 in a usual manner. Control 16 accesses cache 17 by sending the device 12 DASD address D, cylinder address CC and head address HH to addressing hash element 18. Hash element 18 may be constructed as shown in the Benhase et al patent, supra. Hash element 18 outputs an address to a register in scatter index table SIT 19. SIT 19 is a set of registers that store the cache 17 address for data access corresponding to the CCHH address and the CCHH addresses of cache 17 allocated data storage spaces, as is known. SIT 19 supplies the index to access a directory 20 register to obtain the cache 17 address(es) corresponding to the CCHH address of device 12. Directory 20 has a plurality of entries. As used in the prior art, track directory entries TDE 21 store the CCHH and the appropriate cache addresses. In accordance with the present invention cylinder directory entries CDE 22 are inserted in directory 20 for making more efficient use of cache 17, as will become apparent. Each TDE 21 identifies all records in cache 17 from a DASD track CCHH. Each CDE 22 identifies up to N records in cache 17 from any one of a plurality of DASD tracks in any one of plural tracks in one cylinder of tracks.

Figure 2:
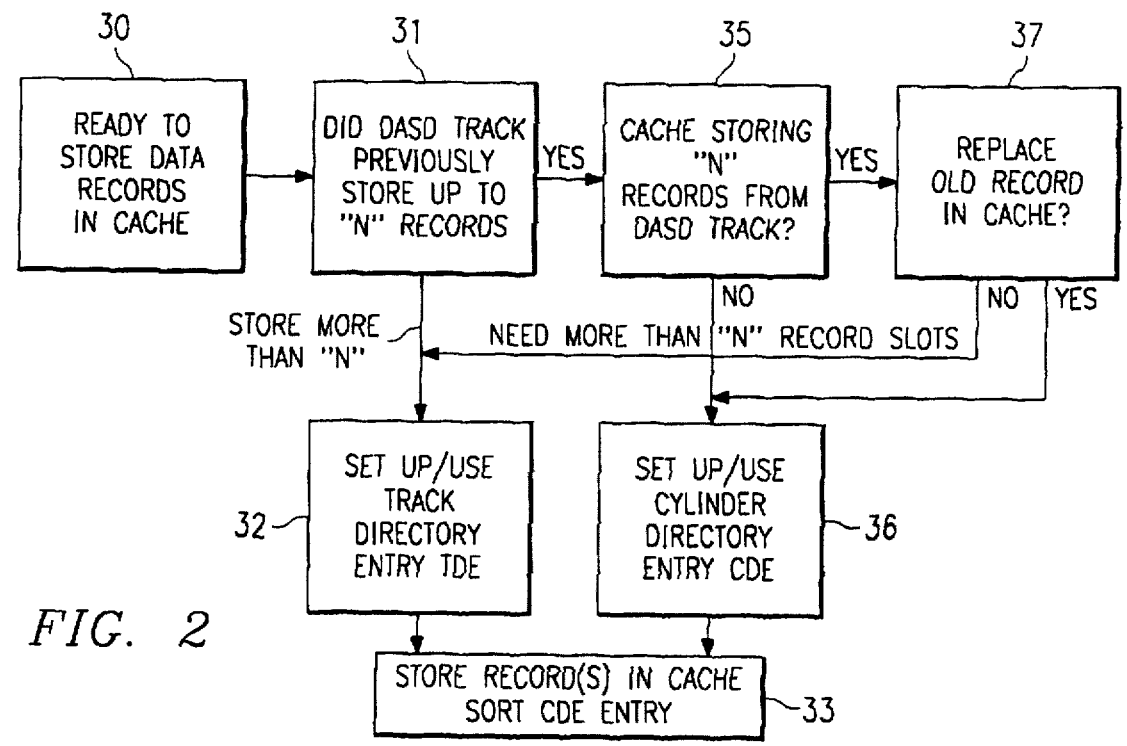
FIG. 2 is a simplified operations flow chart showing operations in the FIG. 1 illustrated system for implementing the present invention.

FIG. 2 shows a general operation sequence for implementing the invention in the FIG. 1 illustrated data processing system. Step 30 indicates that controller 10, in response to a host processor 11 issued command, for example, is ready to access cache 17 for storing data records therein, for example. Step 31 accesses cache event table 40 (FIG. 5) for determining whether or not the CCHH address (identifies one DASD track as will become apparent) in previous caching events for the DASD track resulted in storing up to but not more than N records at one time in cache 17. N is a positive integer. The CCHH address of every DASD 15 track is indicated in the track column 41 of cache event table 40. A later-described cache event parameter (CEP) in column 42, one for each DASD track, has a value M (a second positive integer). Value M indicates whether a prior art TDE directory entry 21 is to be used or if a CDE directory entry 22 is to be used. The value M is derived for a series of cache 17 allocations for the respective DASD 12 tracks to indicate whether prior cache data storage event activity resulted in simultaneously storing a small number N of records in cache 17 or a number of records greater than N. If the cache event parameter CEP indicates storage of more than N records in cache for the CCHH indicated DASD track, then step 32 elects to use a TDE directory entry 21. If CEP indicates not more than N records have been previously recently stored in cache 17 for DASD track CCHH, then step 35 determines if cache 17 is currently storing N records from DASD track CCHH. If cache 17 is currently storing less than N records, then step 36 selects a CDE entry 22 for accessing cache 17. If cache 17 is currently storing N records, then step 37 determines whether or not a currently stored record in cache of track CCHH can be overwritten, i.e. an unmodified record, hence is a replica of the copy of the record stored in DASD 12. If yes, then step 36 is executed. If no record in cache 17 from track CCHH can be overwritten. Then, step 37 prohibits using a CDE 22. A new TDE 21 is created, then step 32 is performed. Step 33 effects storing the track CCHH record(s) in cache 17. If the record is stored using a CDE 22, then the record indications are sorted to make the track identifications in a CDE 22 in an ordered sequence for faster subsequent cache 17 accessing, as will become apparent. In all of the above, if a TDE 21 entry or a CDE 22 entry does not exist when needed, a entry is created. The CEP M value in table 40 (FIG. 5) is changed to reflect that a TDE 21 is to be used rather than a CDE 22 for subsequent accesses to cache 17.

Figure 3:
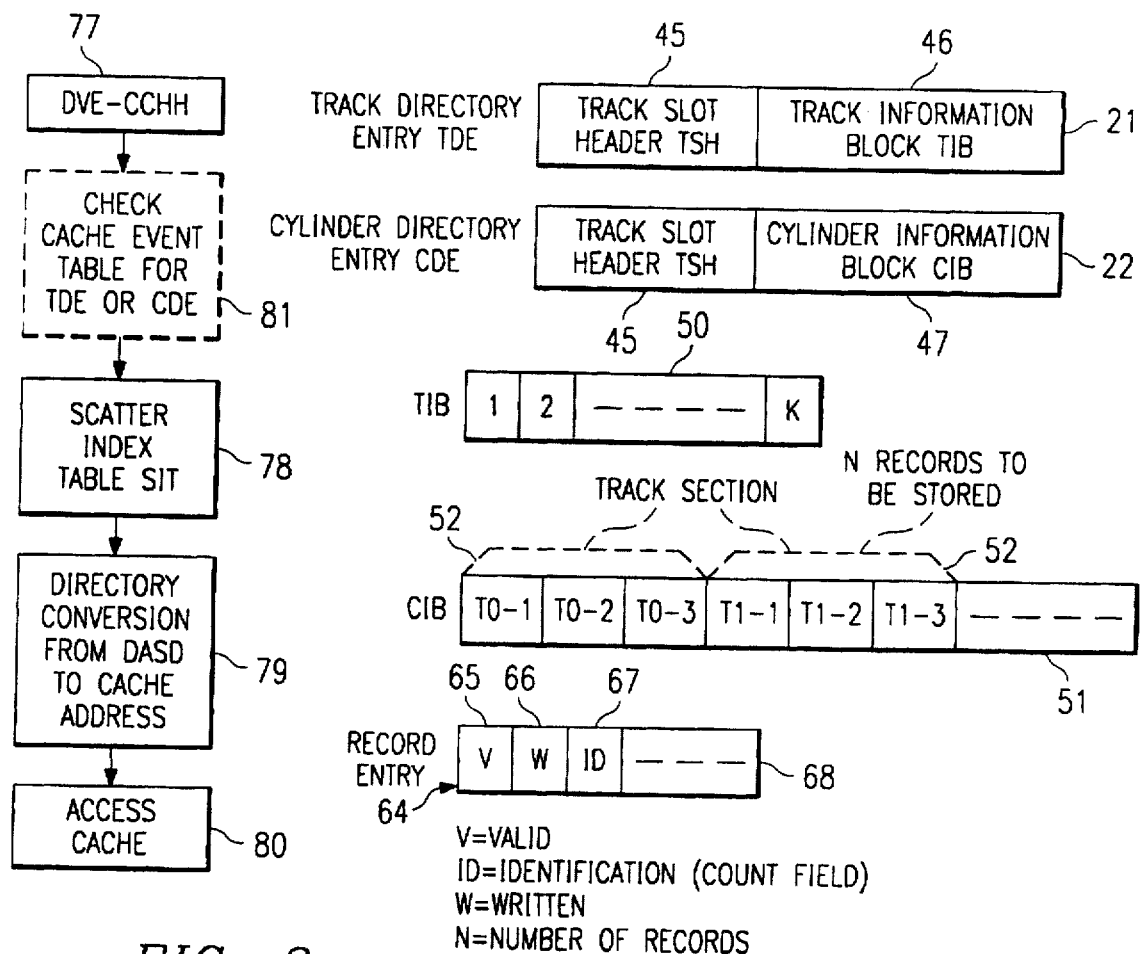
FIG. 3 is a simplified combined operations flow chart and simplified data structure diagram showing accessing a cache directory using the present invention in the FIG. 1 illustrated system.

Details of accessing cache 17 are set forth in FIG. 3. First the directory 20 entries are described. Each TDE entry 21 has a track slot header TSH 45 and a track information block TIB 46. Each TSH 45 defines those data storage space(s) of cache 17 allocated for track CCHH. TIB 47 has an identification and status of each and every record from track CCHH currently stored in cache 17. The record identifications 1-K (K is a third positive integer) are accessed by base plus offset addressing, i.e. the physical location in TIB indicates the number of the record within the track CCHH. Each record identification may also contain the record number and other identification as desired. The record identifications are arranged in a sorted order based on record number. This entry also includes a cache 17 address at which the respective record is store in cache 17.

In contrast to a TDE, each CDE entry 22 stores record identifications for a limited number of records for a plurality of tracks in a cylinder of tracks of DASD 12. Each CDE 22 has a TSH 45 identical to the TDE 22 TSH. A cylinder identification block CIB 47 identifies records from a plurality of DASD tracks in respective cylinders. Each CDE is addressed using the servo track address F. Each DASD track in the represented cylinder CC has a track section 52 (two track sections are shown). Each track section identifies up to N records in cache respectively in fields Tx-1 through Tx-3. Tx is the DASD track number within the cylinder. The track sections are sequentially ordered in the CDE by track number, track 0 (T0) is first, then track 1 (T1), etc. Within each track section are N (shown as three) record entries 1-N identified as T0-1, T0-2, etc. All or less than all of the DASD tracks in a cylinder can be identified in CDE. The mix of TDE's and CDE's in a directory dynamically varies with DASD accessing. Also, each TDE and each CDE provide cache addressing to one so-called track slot of the cache, i.e. equal-sized cache storing areas, no limitation thereto intended.

Figure 4:
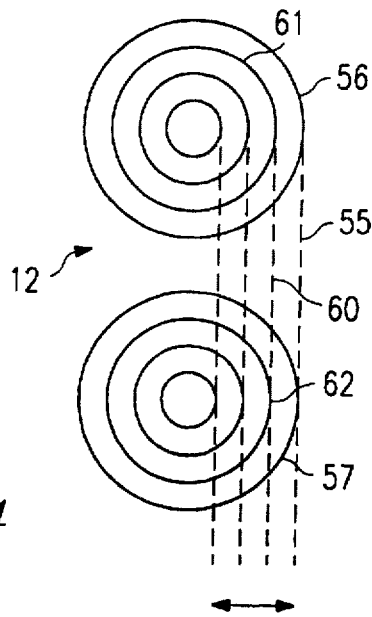
FIG. 4 is a simplified diagram illustrating cylinders in a DASD device and a servo surface of the FIG. 1 illustrated system.

The track-cylinder arrangement is best seen in FIG. 4, one cylinder of tracks 50 includes DASD tracks 55 and 57 having a same radius. Track 55 represents data track 0 of cylinder 50 while track 57 represents the servo track. Servo track 57 is assigned hexadecimal F (decimal 15) address value for addressing the CDE's 22. In an eight disk stack of two-sided disks, radially aligned with data track 0 and servo track F are the other data tracks 1-E(decimal 14) (not shown). Similarly numeral 60 represents a second cylinder of tracks having radially aligned tracks 61 and 62 representing all of the tracks as set forth above. Cache 17 allocated data storage space is identical in size for each TDE 21 and CDE 22. The CDE's are addressed using the servo track address F.

An exemplary directory record entry 64 has an entry valid bit V 65 for indicating valid data storage in cache, a written to or modified bit W 66 for indicating that the record copy in cache 17 is different from the record copy in DASD 12, an identification ID 67 field identifying the record and possibly other data indicated by numeral 68. In the CDE's, ID field 67 includes the record number. It is preferred that in the CDE the record entries be sorted by record number.

The FIG. 3 flow chart illustrates a difference in operation while practicing the present invention from the prior art TDE directory arrangement. Step 77 shows that the track address (device—DVE) cylinder CC and head (disk surface number) address HH has been received. Next the directory 20 is to be accessed for ascertaining if data space is allocated for the record being processed in cache 17. In the prior art, after hashing the DVE-CCHH address, step 78 accesses SIT 19 for obtaining the address of the track directory entry in directory 20. If no directory entry is identified in SIT 19, a TDE cache miss has occurred (no cache data storage space is allocated for DVE-CCHH identified DASD track). If a track directory entry TDE 21 is identified in SIT 19, then, based on the TDE 21 entry data, step 79 translates the DVE-CCHH address to cache 17 address(es). Step 80 accesses cache 17 using the cache 17 address. In the event cache data storage space is allocated but no record has been stored therein, then the corresponding directory 20 entry has V=0 (no valid data).

In accordance with the invention, providing TDE and CDE entries in directory 20, requires intermediate step 81 be performed before SIT 19 is accessed. That is, it is not known whether a TDE 21 or a CDE 22 is to be accessed for finding the cache 17 address in directory 20. Step 81 accesses cache event table 40 (FIG. 5) for finding a current CEP value M for the DASD track CCHH. In the present embodiment, if the value M is more than a threshold, such as three, then a likelihood is that not more than N records will be cached at any one time. Hence a CDE 22 has the address information. Each CDE has a directory 20 address corresponding to servo disk track number F. If M is less than the threshold, then a TDE 21 is accessed as in the prior art.

Figure 5:
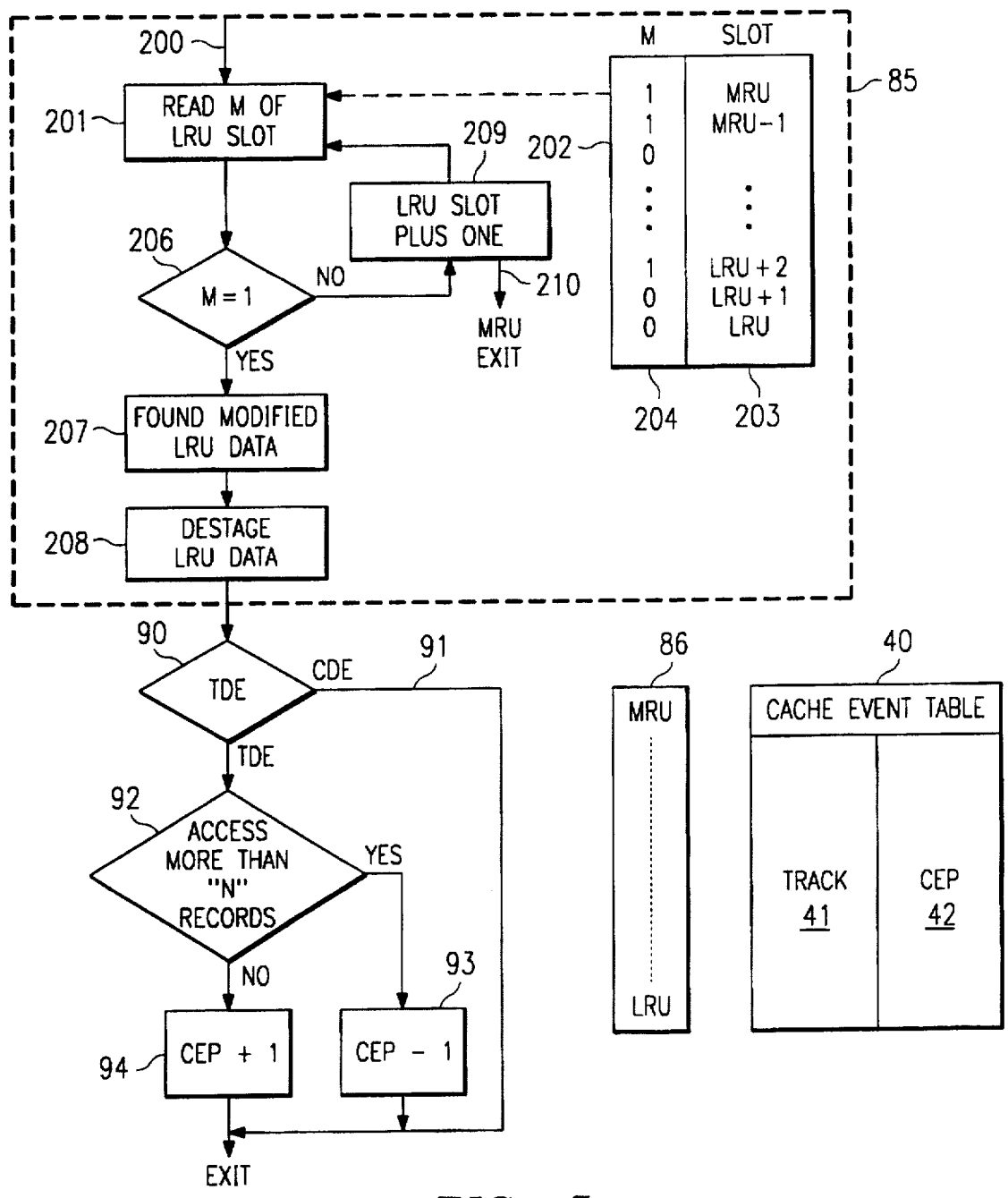
FIG. 5 is a combined simplified operations flow chart and simplified data structure diagram showing a portion of data destaging operations employing the present invention.

FIG. 5 illustrates generating TDE-CDE selection value M. The illustrated algorithm is used only when a TDE 21 is being used when the cached data from a DASD track is being destaged. This algorithm generates a larger number for M whenever not more than N records are being cast out of cache 17 using a least recently used LRU control. Cast out means removed from cache 17 whether destaged to an appropriate DASD track (modified records) or erased (unmodified records). Since unmodified records in cache 17 are identical to a copy of such unmodified records in cache, there is no need to destage such unmodified records. If more than N records are stored, then the value of M is reduced toward zero. If a CDE is used, then no CEP calculations take place. This means that the maximum CEP value for selecting a CDE 22 is M+1. In contrast, for indicating a TDE, a maximum value from threshold M is zero. That is, a number M less than the threshold M. This fact means that once a TDE is used, a minimum of M caching events wherein less than N records are destaged from a cache to a DASD track before a CDE can be used to address data in cache for the DASD track. The initial value of CEP for all DASD tracks is zero (all data in cache 17 are addressed via TDE's), the maximum numerical difference from threshold value M.

It is to be understood that the illustrated algorithm is but one of several choices. That is, CEP threshold may be zero, all negative numbers indicate using a CDE while positive numbers indicate a TDE. Limitations on the maximum positive and negative numbers may be imposed. Also N may be a variable number. i.e. track 0 may store 3 records, track 2 four records, etc.

LRU 85 is a usual least recently used algorithm employing the usual most-recently-used (MRU) least-recently-used (LRU) list 86, as is known. It is preferred that LRU instituted cast out data from cache 17 result in destaging all modified records in the cylinder in which the track resides to DASD 12. For each DASD track in a cylinder being destaged having data in cache 17, programmed control 16 in step 90 examines cache event table 40 for the CEP value in column 42. If CEP>M, then a CDE 22 entry in directory 20 identifies the cache 17 stored data. Machine operations then proceed over path 91 bypassing the algorithmic calculations for CEP. If CEP is not greater than M, then a TDE 21 entry in directory 20 identifies track data stored in cache 17. Accordingly, step 92 counts the number of records transferred during LRU from cache 17 to respective ones of the DASD tracks in a cylinder being destaged as well as the unmodified records that are discarded from cache without copying to the DASD tracks. The algorithm also applies to destaging data to but one DASD track or a plurality of cylinders. If the current storage of records in cache 17 for a DASD track is more than N (a TDE should be used). Then, step 93 reduces the current CEP value by unity toward zero. In the illustrated embodiment a maximum numerical difference from TDE-CDE threshold is the value M, hence CEP is never a negative number. This CEP adjustment tends to keep a TDE 21 for identifying the DASD track for cache 17. A reason for this preference is that it is expected that a greater number of DASD tracks may have a number greater than N cached at one time.

On the other hand, in step 92, if the number of destaged records in cache for a DASD track is not greater than N, then step 94 increases a current CEP value by unity. Once LRU makes CEP=M+1, then on the next ensuing allocation upon staging data from a DASD track to cache 17, a CDE 21 is set up for the cylinder in which the DASD track resides. Only the instant DASD track is identified by the CDE. Later accessed DASD tracks in that one cylinder than a CEP=M+1 are then assigned to the created CDE. DASD tracks in that one cylinder having a CEP value not greater than M are respectively identified by TDE's. In this manner, a TDE is always selected for identifying DASD track data stored in cache 17 until there is a history of a preponderance of caching data from a track with not more than N records at any given instant. Once the history of caching events indicates a small number of records per caching event, then a CDE continues to be used until there is one instance that a DASD track has more than N records. This control is next described with reference to FIG. 6.

Figure 6:
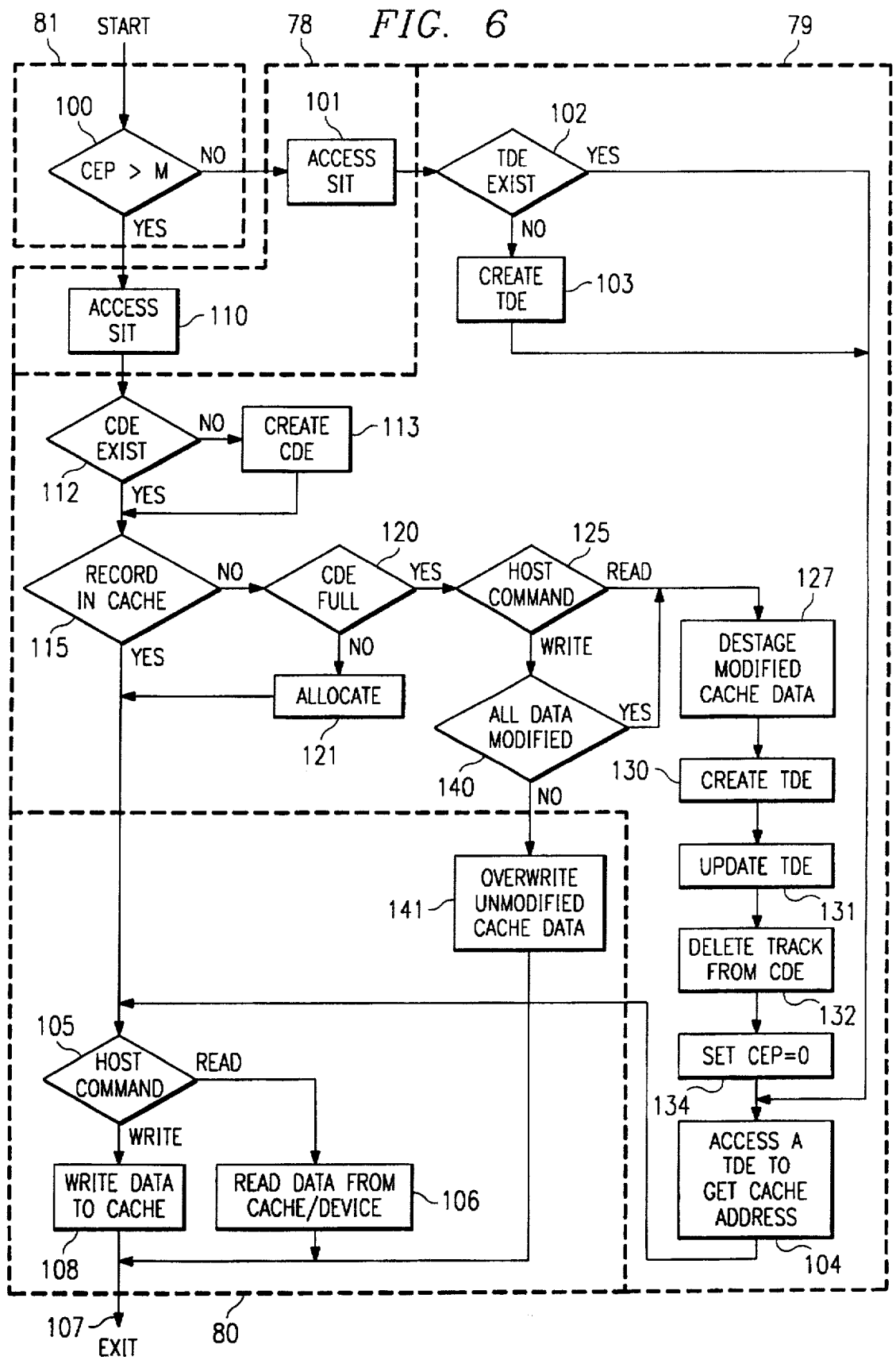
FIG. 6 is a simplified operations flow chart showing accessing a cache using the present invention.

FIG. 6 details the operations represented in FIG. 3. This description assumes that all DASD records in a track have the same size. Further, each commanded DASD access is assumed to be for one record. Step 81 after accessing cache event 40 (FIG. 5) fetches the CEP value for an addressed DASD track. Branch step 100 examines the fetched CEP value. If the CEP current value is not greater than M, then a TDE 21 is accessed. Machine operations proceed to step 78 wherein SIT 19 (FIG. 1) is accessed in step 101. If SIT 19 has no entry for the addressed DASD track, then a TDE cache miss has occurred. A TDE cache miss is indicated in step 102 of FIG. 3 step 79 that no TDE exists (no entry in SIT 19). Step 103 creates a TDE and a corresponding SIT 19 entry using known techniques. Then step 104 accesses the SIT 19 identified TDE. Decision step 105 of step 80 (FIG. 3), examines a received host processor 11 command (not shown) that initiated the cache access for determining whether the commanded DASD 12 operation is a read or write operation. Read operation step 106 then performs the commanded read, if the identified record of the addressed DASD track is not in cache 17 (valid bit V=0 or no directory 20 entry for the record), then a record cache miss of a commanded read has occurred. For a read operation, data including the identified record, are staged to cache 17 from DASD 12, then supplied to host processor 11. If a data cache hit occurred (addressed data has allocated space in cache 17) occurred, for a commanded read operation step 106 reads the addressed data from cache 17 for transmittal to host processor 11. Exit from the illustrated machine operations is effected at 107. If step 105 determines that the commanded operation is a write operation, step 108 transfers data from host processor to cache 17 in the allocated cache space for the addressed track whether a cache data hit or miss occurred. This action completes the TDE effected access to cache 17. Then machine operations exit 107 is taken.

If decision step 100 finds a CEP current value to be greater than TDE-CDE threshold M (i.e. equals M+1), then step 110 of the FIG. 3 illustrated step 78 accesses SIT 19 using the servo track address "F" of the addressed DASD cylinder CC. Remember track address "F" does not relate to any data-addressable track in DASD 12. Hence DASD track address HH=F is used to address a CDE as a "pseudo" DASD track for addressing any one of the data tracks 0-E of the addressed cylinder via directory 20. If step 110 finds no entry in SIT 19 for the addressed DASD track a CDE cache miss has occurred. This detection is represented in FIG. 6 by decision step 112. A CDE cache miss means that no CDE exists. Responding to the CDE cache miss, step 113 creates a new CDE 22 for the cylinder in which the addressed DASD track resides. All DASD tracks in the subject cylinder having a CEP value greater than M will be assigned to the created CDE upon data from these DASD tracks being staged to cache 17. All other DASD tracks in the subject cylinder having a current CEP not greater than M will be identified in cache by a TDE. Alternately, all DASD tracks in the subject cylinder may have their respective CEP values set to M+1. The FIG. 3 illustrated structure indicates what is created using known programmed controls. From step 112, for a CDE cache hit (CDE exists) or for a CDE cache miss from step 113, step 115 reads the identified CDE to ascertain whether or not the addressed DASD track identified record has space allocated in cache 17, i.e. a copy of the identified record is in cache 17. If yes, then steps 105 through 107 are executed. For a commanded read, the identified record is transferred to host processor 11. For a commanded write, the copy of the identified record in cache is updated by a copy transferred to cache 17 from host processor 11. The record entry valid bit V is set to unity (valid data) and bit W is set to unity for indicating a modified record.

If step 115 finds no cache allocation indicated in the track section of the CDE 22 for the identified record (data cache miss), then step 120 checks the record fields Tx-1 through Tx-3 of the appropriate track section of the CIB 47 to ascertain whether all three record fields are filled. If not all three record fields identify records (viz filled), then another record from the addressed DASD track can be stored in cache 17 and identified in the addressed CDE 22. Step 121 allocates space for the identified record and fills in the DASD track section of CDE 22. The record identifications in the track section are sorted in ascending order. After the cache allocation, steps 105–107 are performed.

If in step 120 all record fields of the appropriate track section are filled (CDE is full), then step 125 examines the received host processor 11 command to determine whether the command is to read or write data. If a read is commanded, then steps 127 through 134 are next performed to substitute a TDE for the current CDE. If NO (a write command has been received), then later-described step 140 is performed.

To substitute a TDE 21 for the current CDE for the addressed DASD track only (all other DASD tracks identified in the CDE may continue to be identified), step 127 destages all modified data in the cylinder to DASD 12. Step 130 then creates a new TDE for the addressed track. Note that a CDE provides cache addressing to one allocation space of cache 17 having a size equal to the TDE addressing for one DASD track. Step 130 transfers the CDE track section data for the addressed DASD track to the newly created TDE (updates the TDE) and updates SIT 19 to reflect the new TDE. Step 131 then erases the track section data for the addressed track from the CDE. Note that after these latter steps, if no other tracks are currently using the CDE, then the CDE is erased. Step 134 accesses the cache event table 40 to set the CEP of the addressed track to zero. This action requires the next access to the DASD track requires that the just-created TDE be used for that access. After step 134 completes, step 104 accesses the newly created TDE. Since the identified byte is not in cache, step 104 determines a data cache miss. Then steps 105–107 are performed.

If step 125 finds a host processor 11 commanded write, then step 140 checks the CDE track section for the addressed track to determine whether or not all records currently stored in cache 17 for the addressed DASD track are modified (bit W 66 is set to unity). If at least one of the cache 17 stored records is not modified, then the NO exit is taken to perform step 141 of overwriting a unmodified record with the identified record. The operations of steps 105 and 108 effect this over-writing. If all the cache 17 stored records for the addressed DASD track are modified (YES exit), then step 127 destages all modified records (data). Then steps 130 et seq are performed as described above.

From all of the above it is seen that if only N records are required to be in cache 17 at any one instant, then a CDE 22 is continued to be used. If an access to DASD 12 is required in any data read or write operation while using a CDE to address cache 17, then a TDE 21 is used for the current and next-succeeding DASD 12 accesses for the addressed DASD track. The CDE can identify from one to all DASD tracks residing in a given cylinder of tracks.

While the invention has been particularly shown and described with reference to preferred embodiments thereof, it will be understood by those skilled in the art that various changes in form and details may be made therein without departing from the spirit and scope of the invention.

What is claimed is:

1. A data storage system having a disk storage device with a first given number of co-axial co-rotating disks, each said disk having axially-oppositely-facing addressable surfaces, all of but one of said surfaces being recording surfaces, said one of said surfaces being a servo surface with a plurality of radial-position indicating tracks, said radial position of said radial-position indicating tracks being a radial address portion for said servo tracks and for said recording tracks as track addresses on the respective recording surfaces, said track addresses respectively having first address values said recording surfaces respectively having a plurality of substantially circular axially aligned addressable recording tracks and being respectively axially aligned with said servo tracks, radially-aligned ones of said addressable recording tracks having a same respective radius on respective ones said recording surfaces comprising a cylinder of said radially-aligned recording tracks, said recording tracks storing data up to a maximum number of addressable data records;

a programmed controller in the data storage system connected to said disk storage device for accessing said recording tracks for reading and writing ones of said data records from and onto said recording tracks, a cache in said controller having a plurality of allocatable cache data storing units, a directory in the controller indicating certain ones of said data records stored in said cache data storing units, said directory having a plurality of track directory entries respectively for allocated ones of said cache data storing units, said track directory entries respectively indicating and being addressable by said recording track addresses on said addressable recording surfaces, each of said track directory entries having a given size for storing first indicators to indicate first predetermined ones of said data records storing in said cache in respective ones of said cache data storing units storable in one of said recording tracks storing up to said maximum number of said data records, said controller accessing said directory for obtaining identification of said cache data storing units for accessing said cache to read and store said predetermined ones of said data records from and to said cache;

an improvement including, in combination:

said directory having a predetermined number of cylinder ones of said track directory entries, hereafter cylinder directory entries, each one of said cylinder directory entries respectively having second indicators identifying second predetermined ones of said data records for a plurality predetermined allocated ones of said cache data storing units, means indicating a plurality of cylinder addresses that have address values different from said first address values, said cylinder directory entries being respectively addressable by said cylinder addresses; and each one of said cylinder directory entries having a given plurality of track sections, said track sections respectivly indicating up to a certain number of records in respective ones of said cache data storing units, said certain number being substantially less than said maximum number, said track sections respectively indicating a plurality of second ones of said cache data storing units respectively storing up to said certain number of said second predetermined ones of said data records.

2. The data storage system set forth in claim 1, further including, in combination:

said recording surfaces respectively having unique surface addresses;

said servo surface having a servo surface address different from said unique surface addresses; and said cylinder addresses having said servo surface address and respective ones of said radial address portions.

3. The data storage system set forth in claim 1, further including, in combination:

all of said cache data storing units respectively having identical data storage capacities of a predetermined number of data bytes.

4. The data storage system set forth in claim 1, further including, in combination:

a cache event table in said controller having a plurality of track event status entries, one entry for each of said recording tracks;

each said cache event entry having a cache event parameter indicating a probability of storing in said cache not more than N records at a time respectively from any one of said recording tracks, N being a positive integer;

LRU means in the controller connected to said cache and to said cache event table, said LRU means destaging predetermined ones of said data records from said cache to respective ones of said recording tracks of said disk storage device, during said destaging counting and indicating whether or not a number K of said records being destaged to each of said respective ones of said recording tracks is greater than N;

threshold means in said LRU means indicating a reference value;

first parameter means in said LRU means being responsive to said number K of said predetermined ones of said data records being destaged to a given one of said recording tracks is N or less for adding a first predetermined number to one of said cache event parameter for creating a first updated cache event parameter for said given one of said recording tracks, second parameter means in said LRU means being responsive to said number K being greater than N for adding a second predetermined number to the cache event parameter for creating a second updated cache event parameter for said given one of said recording tracks;

said LRU means storing said updated cache event parameter in said cache event table;

said controller having directory control means with first access means for responding to any one of said recording tracks having a cache event parameter value having a first numerical difference from said reference value for accessing a respective one of said track directory entries for accessing said cache; and said directory control means having second access means for responding to any of said recording tracks having a cache event parameter value with a second numerical difference from said reference value for accessing a respective one of said cylinder directory entries for accessing said cache.

5. The data storage system set forth in claim 4, further including, in combination:

said first access means having a plurality of said first numerical differences, each of said plurality of first numerical differences having a unique numerical value.

6. The data storage system set forth in claim 4, further including, in combination:

said LRU means having means for identifying and responding to said destaging data from said cache addressable by one of said cylinder directory entries to inhibit second parameter means from creating said second updated parameter value for maintaining without change in said cache event parameter value for said given recording track; and said LRU means having means for identifying and responding to said destaging data from said cache addressable by said track directory entries to actuate said first and second parameter means to generate said first and second updated cache event parameter values, respectively.

7. The data storage system set forth in claim 6, further including, in combination:

requesting means connected to said directory control means for requesting access to said cache for an addressed one of said recording tracks;

said directory control means responding to said requested cache access to examine said cache event parameter table for reading said cache event parameter value for said addressed one of said recording tracks as a first addressed parameter; and selecting means in said directory control means responsive to said first addressed parameter having said first numerical difference to access one of said track directory entries for obtaining a cache address and further responding to said first addressed parameter having said second numerical difference for accessing one of said cylinder directory entries for obtaining a cache address.

8. The data storage system set forth in claim 7, further including, in combination:

said directory control means having directory entry initialization means connected to said requesting means for responding to a second one of said requests to access for a second addressed one of said recording tracks resulting in identifying no allocated cache data storing unit to access said cache event table for reading said cache event parameter as a second addressed parameter;

track means in said initialization means for responding to second addressed parameter having said first numerical difference for initializing a new one of said track directory entries for said second addressed one of said recording tracks; and cylinder means in said initialization means for responding to said second addressed parameter having said second numerical difference for initializing a new one of said cylinder directory entries.

9. The data storage system set forth in claim 7, further including, in combination:

hashing means in said directory control means;

said hashing means identifying said track directory entries by said addressable recording track respective addresses; and said hashing means identifying said cylinder directory entries by said servo track respective addresses.

10. The data storage system set forth in claim 1, further including, in combination:

cache event table means having a table of cache parameters respectively for each of said recording tracks;

said cache parameters respectively indicating which ones of said recording tracks are likely to cache more than a given number of records at one time in said cache as a first cache indication and indicating which ones of said recording tracks are likely to cache not more than said second given number of said records at one time in said cache as a second cache indication;

requesting means in said controller for issuing requests to access said cache having a given address of an addressed one of said recording tracks;

cache access means in said controller connected to said requesting means and said directory for accessing said cache;

said cache access means being connected to said cache event table means for reading said table for reading said cache parameter for said addressed one of said recording tracks as an addressed parameter, said cache access means being responsive to said addressed parameter having said first cache indication for accessing said directory for reading a one of said track directory entries and to said second cache indication for accessing said directory for reading one of said cylinder directory entries;

cache miss means in said cache access means for detecting and indicating, as a cache miss indication, that said directory contains neither one of said track directory entries nor one of said cylinder directory entries for said addressed one of said recording tracks; and initialization means in said controller connected to said cache miss means, said cache event table means and to said directory for responding jointly to said cache miss indication and to said cache parameter for addressing one of said recording tracks for initializing a new directory entry in said directory said initialization means responding to said first and second cache indications for respectively initializing said new directory entry as a track directory entry or a cylinder directory entry.

11. The data storage system set forth in claim 10, further including, in combination:

threshold means having a parameter threshold value indicating that while said cache parameters for first respective ones of said recording tracks exceed said parameter threshold value that said cylinder directory entries are to be respectively used for accessing said cache and while said cache parameters for other respective ones of said recording tracks do not exceed said parameter threshold value that said track directory entries are to be respectively used for accessing said cache;

least recent means in said cache access means for detecting and identifying least recently used ones of said data records stored in said cache;

cast out means in said controller connected to said least recent means and said cache for casting out predetermined ones of said least recently used ones of said data records by transferring a copy of said predetermined ones of said least recently used data records stored in said cache to predetermined ones of said recording tracks, respectively;

said cast out means casting out respective given numbers of said predetermined ones of said least recently used data records to said predetermined ones of said recording tracks;

said cast out means having parameter updating means connected to said cache table means, said parameter updating means responding to respective said given numbers of said data records cast out for updating said cache parameters respectively for said recording tracks;

threshold means indicating a reference number as a threshold value at which predetermined changes to said cache parameter values are to be changed; said parameter updating means having a parameter modifier for updating said cache parameters only for those recording tracks identified in said directory by said track directory entries, respectively; and said parameter modifier being responsive to first ones of said given numbers being not greater than said reference number for respectively changing values of said cache parameters for first ones of said predetermined ones of said recording tracks identified in first respective ones of said track directory entries toward said parameter threshold value and being responsive to second ones of said given numbers greater than said reference number for respectively changing said cache parameter values for second ones of said recording tracks identified by second respective ones of said track directory entries away from said parameter threshold value whereby said first ones of said recording tracks can become eligible to be identified by respective ones of said cylinder directory entries as soon as said first ones of said given numbers become equal to said parameter threshold value and said second ones of said recording tracks continue to be identified in respective ones of said track directory entries.

12. The data storage system set forth in claim 9, further including, in combination:

said recording surfaces respectively having unique surface addresses;

said servo surface having a servo surface address different from said unique surface addresses;

said track directory entries respectively having track slot headers and track information blocks, said track information blocks respectively storing said first indicators to indicate said first predetermined ones of said data records gored in said cache;

said cylinder directory entries having said track slot headers and having cylinder information blocks, said cylinder information blocks storing said second indicators identifying second predetermined ones of said data records stored in said cache;

said track slot headers in said track and cylinder directory entries respectively indicating first ones of said cache storing units storing said data records indicated in track information blocks in said track directory entries and second ones of said cache storing units storing said data records indicated in said cylinder information blocks; and said cylinder addresses having said servo surface address and respectively said radial address portions.

13. A data storage system having a disk storage device with a first given number of co-axial co-rotating disks, each said disk having axially-oppositely-facing surfaces, all of but one of said surfaces being recording surfaces, said one of said surfaces being a servo surface with a plurality of radial-position indicating servo tracks respectively having servo track radial addresses said recording surface respectively having a plurality of substantially-circular axially-aligned addressable tracks respectively axially aligned with said servo tracks, all of said addressable tracks having a same radius on respective ones said recording surfaces comprising a cylinder of said radially-aligned tracks, said addressable tracks in said cylinders being recording tracks, said recording tracks storing data as addressable data records up to a maximum number of said data records, each of said recording tracks and said servo tracks having a radial address said addresses of said recording tracks respectively having surface address portions indicating said recording surfaces the recording tracks reside on and respective ones of said radial address, said servo surface not being addressable by said data storage system;

a cache having a plurality of addressable data storing areas for respectively storing data stored in respective ones of said recording tracks and being connected to said disk storage device for storing staged ones of said data records for said recording tracks, respectively;

a directory connected to said cache for addressing said addressable data storing areas with said addresses for addressing said recording tracks, respectively;

a first plurality of track directory entries in said directory for respectively addressing first predetermined ones of said addressable data storing areas for storing a number greater than N of said records from each of said first plurality of first predetermined ones of said recording tracks where N is a positive integer having a value substantially less than, said maximum number a second plurality of said track directory entries being cylinder directory entries in said directory for addressing second predetermined ones of said addressable data storing areas for addressing a number not greater that N of said records from second predetermined ones of said recording tracks;

each one of said cylinder directory entries for addressing a given plurality of said second predetermined ones of said addressable data storing areas that respectively store data from said given plurality of said recording tracks;

means assigning a servo surface address to said servo surface;

said first plurality of said track directory entries being respectively addressable by said track addresses; and said cylinder directory entries being addressable by said servo surface address and respective ones of said servo track radial addresses.

14. A method of operating a data storage system having a disk storage device with a first given number of addressable co-axial co-rotating disks, each said disk having axially-oppositely-facing surfaces, all of but one of said surfaces being recording surfaces, said one of said surfaces being a servo surface with a plurality of radial-position-indicating substantially-circular servo tracks, said recording surfaces respectively having a plurality of substantially-circular axially-aligned addressable tracks respectively axially aligned with said servo tracks, all of said addressable tracks having a same radius on respective ones said recording surfaces comprising a cylinder of said radially aligned tracks, said tracks in said cylinders being recording tracks, said recording tracks storing data as addressable records, said recording tracks respectively having a track addresses, each of said track addresses having a unique value, said recording tracks having respective data storage capacities of a given predetermined number of said records;

a cache having a plurality of addressable data storage areas and being connected to said disk storage device for storing up to said predetermined number of said records;

a directory connected to said cache for addressing said addressable data storage areas with said addresses for addressing said recording tracks, respectively;

including steps of:

providing a first plurality of track directory entries in said directory for addressing first predetermined ones of said addressable data storage areas for storing up to said predetermined number of said records from respective ones of said recording tracks;

providing a second plurality of said track directory entries as cylinder directory entries in said directory, each of said cylinder directory entries for addressing not greater than N of predetermined records stored in each one of said second predetermined ones of said addressable data storage areas that are addressable by addresses of second predetermined ones of said recording tracks, respectively, N being a positive integer indicating a number of records substantially less than said predetermined number;

addressing said track directory entries using addresses of said recording tracks indicated by said track directory entries, respectively;

providing a set of non-data addresses, said non-data addresses having values different from said unique values of said recording track addresses;

addressing said cylinder directory entries using said set of non-data addresses, respectively;

in each of said cylinder directory entries providing a plurality of track sections;

in said track sections, respectively storing indication up to N records from a given plurality of ones of said second predetermined ones of said recording tracks; and said track sections in said cylinder directory entries, respectively addressing said given plurality of said second predetermined ones of said addressable data storage areas.

15. The method set forth in claim 14, including steps of:

establishing cylinder addresses for said cylinders of said recording and servo radially aligned tracks, respectively;

establishing head addresses for each of said recording surfaces and said servo surface;

establishing said non-data addresses as a head address for said servo surface plus said cylinder address, respectively;

for addressing said track directory entries, creating said recording track addresses to include said respective predetermined ones of said cylinder addresses with respective ones of said head addresses.

16. The method set forth in claim 15, including steps of:

generating a cache event table in said controller having a plurality of track event status entries, one entry for each of said recording tracks;

in each said cache event entry, generating a cache event parameter indicating a probability of storing in said cache not more than N records at a time respectively from any one of said recording tracks, N being a positive integer;

monitoring a predetermined accessing said cache for accessing predetermined ones of said data storage areas;

responding to said monitoring for creating and maintaining an ordered list of most recently accessed ones of said cache data storage areas for identifying least recently used ones of said cache data storage areas;

examining said ordered list for casting out from said cache to respective ones of said recording tracks modified ones of said records stored in predetermined ones of said least recently used ones of said cache data storage areas and overwriting unmodified ones of said records stored in said predetermined ones of said least recently used ones of said cache data storage areas;

while casting out said modified and unmodified records from said predetermined ones of said least recently used cache data storage areas indicating whether a number K of said records being cast out is greater than N;

establishing a cache event threshold value;

responding to said number K of said respective ones of said records being cast out of said cache is N or less for adding a first predetermined number to respective ones of said cache event parameters for creating first updated cache event parameters for first respective ones of said recording tracks, responding to said number K for said respective ones of said records being cast out from said cache is greater than N for adding a second predetermined number to the respective cache event parameters of second respective ones of said recording tracks to a given predetermined value for creating second updated cache event parameters for said second respective ones of said recording tracks;

storing said first and second updated cache event parameters in said cache event table;

while accessing said cache, responding to any one of said recording tracks having a cache event parameter value having a first numerical difference from said cache event threshold value for accessing a respective one of said track directory entries to access said cache; and while accessing said cache, responding to any of said recording tracks having a cache event parameter value with a second numerical difference from said cache event threshold value for accessing a respective one of said cylinder directory entries to access said cache.

17. The method set forth in claim 16, including steps of:
in said casting out step, responding to said records being cast out that were addressable in said cache by at least one of said cylinder directory entries as cylinder destaged records; and
responding to said cylinder destaged records being cast out to maintain without any change said cache event parameter for said recording tracks respectively receiving and storing said cylinder destaged records.

18. The method set forth in claim 17, including steps of:
making a second access request for a second addressed one of said recording tracks;
finding no track directory entry nor cylinder directory entry in said directory for said second addressed one of said recording tracks, responding to said finding step to indicate a cache miss;
responding to said cache miss for reading said cache event parameter of said second addressed recording track as a second addressed parameter; and
responding to said second addressed parameter having said first numerical difference for initializing a new one of said track directory entries for said second addressed one of said recording tracks and to said second addressed parameter having said second numerical difference for initializing a new one of said cylinder directory entries.

19. The method set forth in claim 18, including steps;
providing in each of said cylinder directory entries's, for each record stored in said cache, a record identification and a status of said record in said cache; and
sorting said record entries for respective ones of said second predetermined ones of said recording tracks identified in said cylinder directory entries for making said record entries in a sorted order.

20. The method set forth in claim 18, including a step of:
initializing said cache event table to indicate that all of said recording tracks are to be identified in said directory by said first plurality of said track directory entries.

21. The data storage system set forth in claim 1, further including, in combination:
updating means in said controller for updating said cylinder directory entries;
modified means in each of said cylinder directory entries for indicating whether said records stored in said cache are modified or unmodified from a copy of such indicated records stored in said disk storage device; and
said updating means responding to said modified means indicating that said indicated records stored in said cache are unmodified to overwrite said indicated records with overwriting records and to update said cylinder directory entry for indicating said overwriting records.

22. In the method set forth in claim 14, including steps:
indicating in a predetermined one of said cylinder directory entries that predetermined ones of said records stored in the cache are not modified from a copy of said predetermined ones of said records stored in said disk storage device; and
overwriting said predetermined ones of said records stored in said cache with overwriting records, then overwriting said predetermined one of said cylinder directory entries with an identification of said overwriting records.

23. A program product for operating a data storage system having a disk storage device with a first given number of addressable co-axial co-rotating disks, each said disk having axially-oppositely-facing surfaces, all of but one of said surfaces being recording surfaces, said one of said surfaces being a servo surface with a plurality of radial-position-indicating substantially-circular servo tracks, said recording surfaces respectively having a plurality of substantially-circular axially-aligned addressable tracks respectively axially aligned with said servo tracks, all of said addressable tracks having a same radius on respective ones said recording surfaces comprising a cylinder of said radially aligned tricks, said tracks in said cylinders being recording tracks, said recording tracks storing data as addressable records, each of said recording tracks having a track address, said recording tracks each having a data storage capacity of a given predetermined number of said records;

a cache having a plurality of addressable data storage areas and being connected to said disk storage device for storing predetermined ones of said records;

a directory connected to said cache for addressing said addressable data storage areas with said addresses for addressing said recording tracks, respectivly;

the program product comprising:
computer program storage means containing machine-sensible-and-executable program instructions, said program instructions including:
first computer program instructions for providing a first plurality of track directory entries in said directory for addressing first predetermined ones of said addressable data storage areas respectively storing more than N records that are only addressable by respective addresses of first predetermined ones of said recording tracks having a number greater than N of said records, N being a positive integer having a value substantially less than said given predetermined number, said first computer instructions providing said first plurality of track directory entries to have a given capacity for storing a first predetermined number of control data signals;

first addressing computer program instructions for addressing said track directory entries using addresses of said first predetermined one of said recording tracks, respectively;

second computer program instructions for providing a second plurality of cylinder directory entries in said directory for respectively addressing second predetermined ones of said addressable data storage areas for addressing not greater than said N number of said records addressable by addresses of second predetermined ones of said addressable recording tracks, said second computer program instructions providing said cylinder directory entries to be said given capacity, said second computer program instructions providing each one of said cylinder directory entries with addresses of a plurality of said second predetermined ones of said recording tracks; and second addressing computer program instructions for establishing a set of addresses indicating respective radial positions of said radial-position-indicating servo track and a surface address for said servo disk, then addressing said cylinder directory entries using said set of addresses to address said cylinder directory entries, respectively.

24. The program product set forth in claim 23 wherein said recording tracks are arranged in cylinders of said recording tracks; and parameter computer program instructions generating a cache event table having a plurality of track event status entries, one entry for each of said recording tracks;

parameter generating computer program instructions in said parameter program instructions generating in each said cache event entry, a cache event parameter indicating a probability of storing in said cache not more than N records at a time respectively from any one of said recording tracks, N being a positive integer;

monitoring computer program instructions for monitoring a predetermined accessing said cache for accessing predetermined ones of said data storage areas for responding to said monitoring for creating and maintaining an ordered list of most recently accessed ones of said cache data storage areas for identifying least recently used ones of said cache data storage areas;

examining computer program instructions for examining said ordered list for generating a cast-out list of said records to be cast out from said cache as cast out records;

record cast-out computer program instructions responding to said examining program instructions for casting out modified ones of said cast-out records including writing a copy of said modified ones of said cast-out records to respective ones of said recording tracks and for casting out unmodified ones of said cast-out records overwriting said unmodified ones of said cast-out records with predetermined other ones of said records;

parameter value computer program instructions responding to and while said record cast-out program instructions are casting out said modified and unmodified records from said predetermined ones of said least recently used cache data storage areas indicating whether a number K of said records being cast out is greater than N;

parameter reference computer program instructions establishing a cache event threshold value;

first parameter update computer program instructions responding to said number K of said respective ones of said records being cast out of said cache is N or less for adding a first predetermined number to respective ones of said cache event parameters for creating first updated cache event parameters for first respective ones of said recording tracks, second parameter update computer program instructions responding to said number K for said respective ones of said records being cast out from said cache is greater than N for adding a second predetermined number to the respective cache event parameters of second respective ones of said recording tracks to a given predetermined value for creating second updated cache event parameters for said second respective ones of said recording tracks;

parameter storing computer program instructions storing said first and second updated cache event parameters in said cache event table; and cache access computer program instructions for accessing said cache, said cache access program instructions responding to any one of said recording tracks having a cache event parameter value having a first numerical difference from said cache event threshold value first accessing a respective one of said track directory entries to access said cache and responding to any of said recording tracks having a cache event parameter value with a second numerical difference from said cache event threshold value for accessing a respective one of said cylinder directory entries to access said cache.

* * * * *